United States Patent [19]

Bailly et al.

[11] Patent Number: 4,490,475

[45] Date of Patent: Dec. 25, 1984

[54] PROCESS FOR THE PREPARATION OF SUPPORTS BASED ON MAGNESIUM CHLORIDE FOR THE PREPARATION OF CATALYSTS FOR THE POLYMERIZATION OF ALPHA-OLEFINS AND THE SUPPORTS OBTAINED

[75] Inventors: Jean C. Bailly, Martigues; Stylianos Sandis, Lavera, both of France

[73] Assignee: BP Chimie Societe Anonyme, Courbevoie, France

[21] Appl. No.: 504,980

[22] Filed: Jun. 16, 1983

[30] Foreign Application Priority Data

Jun. 24, 1982 [FR] France ................................ 82 11053

[51] Int. Cl.$^3$ ................................................ C08F 4/02
[52] U.S. Cl. ................................... 502/156; 502/104; 502/121; 502/122; 502/123; 502/126; 502/128; 502/134; 502/152; 502/155; 502/162; 502/167; 502/168; 502/169; 502/226; 526/125
[58] Field of Search ............... 502/226, 169, 156, 162, 502/167, 168, 104, 134, 126, 121, 122, 123, 128, 152, 155

[56] References Cited

U.S. PATENT DOCUMENTS

| | | | |
|---|---|---|---|
| 4,220,554 | 9/1980 | Scata et al. | 502/119 |
| 4,250,288 | 2/1981 | Lowery et al. | 502/128 X |
| 4,252,670 | 2/1981 | Caunt et al. | 502/110 |
| 4,314,912 | 2/1982 | Lowery et al. | 502/128 X |
| 4,329,253 | 5/1982 | Goodall et al. | 502/111 |
| 4,364,851 | 12/1982 | Shiga et al. | 502/169 X |
| 4,399,054 | 8/1983 | Ferraris et al. | 502/134 X |
| 4,414,132 | 11/1983 | Goodall et al. | 502/169 |

FOREIGN PATENT DOCUMENTS

| | | |
|---|---|---|
| 24933 | 2/1981 | European Pat. Off. |
| 2014887 | 4/1970 | France |
| 2143346 | 2/1973 | France |
| 1580635 | 12/1980 | United Kingdom |

*Primary Examiner*—Patrick Garvin
*Attorney, Agent, or Firm*—Brooks Haidt Haffner & Delahunty

[57] ABSTRACT

The present invention relates to catalyst supports for the polymerization and co-polymerization of alpha-olefins, especially ethylene and propylene, consisting essentially of magnesium chloride, characterized in that these supports occur in the form of spheroidal particles with a mean particle size by mass comprised between 10 and 100 microns and having a narrow particle size distribution, which can be controlled, such that the ratio of the mean diameter by mass to the mean diameter by number of the particles is less than or equal to 3.0, and the process for the preparation of the said supports.

21 Claims, No Drawings

PROCESS FOR THE PREPARATION OF SUPPORTS BASED ON MAGNESIUM CHLORIDE FOR THE PREPARATION OF CATALYSTS FOR THE POLYMERIZATION OF ALPHA-OLEFINS AND THE SUPPORTS OBTAINED

The present invention relates to supports consisting essentially of magnesium chloride intended for the preparation of catalysts for the polymerisation and copolymerisation of alpha-olefins, and also to a process for the preparation of these supports.

It is known that polymerisation catalysts for alpha-olefins, known as Ziegler-Natta catalysts, are obtained by the combination of transition metal compounds belonging to Groups IV, V or VI of the Periodic Table of elements with organometallic compounds of Groups I to III of the Table.

It is known that the properties of these catalysts may be improved if the said transition metal compound is used together with a solid mineral compound. This solid mineral compound may be co-precipitated with the said transition metal compound or may be used as a support for the said transition metal compound.

As a solid mineral compound which can be used as support, one may list for example oxides of magnesium and titanium, aluminum silicate, magnesium carbonate and magnesium chloride.

In this technique, where the solid mineral compound is used as a support, it is essential for this support to possess a set of specific properties so that the catalyst itself is at the same time reproducible, easy to handle, has a high yield and is possibly stereospecific. That is why numerous works have been concerned with processes for the preparation of these supports.

In the more particular case where the support is magnesium chloride, various preparation processes have been put forward. For example, for a long time the preparation of anhydrous magnesium chloride from an organo-magnesium compound has been described; indeed, it is very well known in organic chemistry that the reaction of an organo-magnesium compound with a mineral or organic or organoaluminum halogenated compound gives rise to small particles of $MgCl_2$. The pulverisation/dehydration of a hydrated magnesium chloride has also been described. Finally, the operation of pulverisation of magnesium chloride particles has been described, possibly in the presence either of a reagent or of a metal compound of a transition metal.

The present invention relates to a process for the preparation of magnesium chloride particles ($MgCl_2$) of a spheroidal shape and with a controllable particle size, these particles being utilisable advantageously as supports for the production of catalysts for polymerising alpha-olefins.

These magnesium chloride particles are obtained by the reaction, in itself known, of decomposition in a hydrocarbon medium of an organo-magnesium compound by a chlorinated organic compound, but complying with the following conditions:

the organomagnesium compound utilised is a dialkyl magnesium, with the formula $R_1MgR_2$ in which $R_1$ and $R_2$ are different or identical alkyl radicals with from 2 to 12 carbon atoms, soluble in the liquid hydrocarbon medium, the chlorinated organic compound is an alkyl chloride of the formula $R_3Cl$ in which $R_3$ is a secondary or preferably tertiary alkyl, having from 3 to 12 carbon atoms, the molar ratio between this chlorinated organic compound and the organomagnesium compound being comprised between 1.5 and 2.5, the reaction is performed in the presence of an electron donor compound comprising at least one atom of oxygen, sulphur, nitrogen and/or phosphorus, in a quantity such that the molar ratio between this electron donor compound and the organomagnesium compound is comprised between 0.01 and 2 and preferably between 0.01 and 1, the reaction takes place under agitation in a liquid hydrocarbon, at a temperature comprised between 5° C. and 80° C.

The organomagnesium compound utilised has the formula $R_1MgR_2$ in which $R_1$ and $R_2$ are identical or different alkyl radicals with from 2 to 12 carbon atoms. One of the important properties of this organomagnesium compound is that of being soluble in the hydrocarbon medium in which the reaction is to take place. Experience shows that there is no point in using products where the $R_1$ and $R_2$ radicals are too heavy, because on the one hand the said products have reactivity levels—all other things being equal—which become less and less as the number of carbon atoms in $R_1$ and $R_2$ increases, and because on the other hand the alkanes ($R_1H$ and $R_2H$) produced by the reaction are difficult to separate from the reaction medium, and finally because the content of weight of magnesium present in the organomagnesium compound decreases as the number of carbon atoms in $R_1$ and $R_2$ increases.

Considerations of a similar nature (reactivity, nature of products obtained and yield by weight) apply to the choice of the chlorinated organic compound, and this is why $R_3$ must not contain too many carbon atoms. Moreover, to date the best results have been obtained with $R_3Cl$ products in which $R_3$ is a tertiary alkyl radical. The molar ratio between $R_3Cl$ and the organomagnesium compound must be comprised between 1.5 and 2.5 approximately. If the ratio is less than 1.5 (the stoichiometric quantity being 2), the yield of the reaction decreases notably. On the other hand, when this molar ratio increases from 1.5 to 2, it has been found that the density of the magnesium chloride particles obtained according to the present invention decreases slightly, then that this density decreases rapidly when this molar ratio increases beyond 2. Now experience has shown that in some cases it is of interest to use a catalyst prepared from magnesium chloride particles having a comparatively high density. It is then preferable to keep to a molar ratio of $R_3Cl:R_1MgR_2$ of less than 2 and more especially comprised between 1.85 and 1.95. Under these conditions it is found that the reaction medium contains, depending on the nature and quantity of the electron donor compound employed, products comprising Mg—C bonds soluble in the liquid hydrocarbon medium. It is also found that the magnesium chloride particles obtained generally contain, after several washings and extractions by means of liquid hydrocarbon, products comprising at least one Mg—C bond. Such supports are particularly useful in the preparation of catalysts for the polymerisation or copolymerisation of ethylene.

Experience has also shown that the molar ratio of $R_3Cl:R_1MgR_2$ may be equal to or greater than 1.95, and preferably be comprised between 2.0 and 2.2 and that the magnesium chloride particles obtained do not contain products having at least one Mg—C bond. They represent supports which are particularly useful in the preparation of catalysts intended for the polymerisation or copolymerisation of propylene.

The electron donor compound is an organic compound known as such, or as a Lewis base, comprising in particular at least one atom of oxygen, sulphur, nitrogen and/or phosphorus. The electron donor compound may be chosen from among a great variety of products, such as for example the amines, amides, phosphines, sulphoxides, sulphones or ethers. The quantity of electron donor compound to be utilised during the reaction depends partly on the nature and quantity of the organomagnesium compound and the nature of the electron donor compound, especially its complexing capacity. Thus if one chooses an electron donor compound with a high complexing power, such as for example hexamethylhosphorotriamide (HMPA), this compound must be present in a quantity of at least about 0.01 mole per mole of $R_1MgR_2$ used. On the other hand, should an electron donor compound with a low complexing power be used, such as for example an ether oxide, the quantity employed must be at least about 0.03 mole of electron donor per mole of $R_1MgR_2$ utilised. If the quantity of electron donor is less than these limits, it is found that the particles of magnesium chloride obtained have less regular shapes and a comparatively broad particle size distribution. If, on the other hand, the quantity of electron donor compound is too high, in particular equal to or greater than approximately 2 moles per mole of $R_1MgR_2$ used, it is found that the reaction develops less regularly, especially at the start, which leads to magnesium chloride particles having an undesired shape and particle size distribution.

Particularly interesting results are obtained when an aliphatic ether oxide is used as the electron donor compound, having the formula $R_4OR_5$ in which $R_4$ and $R_5$ are identical or different alkyl radicals having 1 to 12 carbon atoms, in a quantity such that the molar ratio between this ether oxide and the organo-magnesium compound is comprised between 0.03 and 2, preferably between 0.03 and 1, and particularly between 0.2 and 0.5. When such an aliphatic ether oxide is used, it is preferred to carry out the reaction in an agitated medium, in a liquid hydrocarbon, at a constant temperature preferably between 35° and 80° C.

The use of the electron donor compound in the reaction may be performed in various ways depending partly on the actual nature of the electron donor compound and on the nature of $R_1MgR_2$. For example, in the case of an electron donor compound with a high complexing power, the whole of the said electron donor compound may be added to $R_1MgR_2$ or, preferably, to $R_3Cl$ before the reaction commences; but one may also distribute the electron donor compound between $R_1MgR_2$ and $R_3Cl$. If an electron donor compound with a low complexing power is used, such as an ether oxide, the latter may preferably be introduced either in its entirety with $R_1MgR_2$, or divided between $R_1MgR_2$ and $R_3Cl$; in this latter case it is preferable to admit, into the liquid hydrocarbon medium and prior to the introduction of the reactants, at least 0.03 mole of the electron donor compound per mole of $R_1MgR_2$ utilised.

The reaction between $R_1MgR_2$ and $R_3Cl$ gives rise to a solid product; a precipitation is thus involved; the specialist knows that in this case physical factors such as the viscosity of the medium, the mode and speed of agitation, the conditions under which the reactants are employed, the agitation, and the length of reaction, all other things being equal, may play an important part in the shape, structure, size and particle size distribution of the abovementioned particles.

This is evidently the case in the present invention, and that is why it is stated that:

a. If it is desired to obtain a support with the narrowest possible particle size distribution, as defined by the ratio of the mean diameter by mass, Dm, to the mean diameter by number, Dn, comprised between about 1.1 and 1.5, it is desirable that:

the reaction should be performed by introducing $R_3Cl$ gradually into the liquid hydrocarbon medium containing $R_1MgR_2$, that the reaction should be performed in the presence of an electron donor compound in a quantity such that the molar ratio between the said electron donor compound and $R_1MgR_2$ is less than 1, the reaction should be performed in a liquid hydrocarbon agitated at a constant speed through the entire duration of the reaction, and, all other things being equal, the reaction should be relatively slow, of the order of at least 1 hour, so as to permit of a suitable arrangement of the solid product formed.

b. If it is desired to obtain a support with a particle size distribution which is less narrow than that above, such that the ratio of Dm:Dn is comprised between about 1.5 and 3.0, and particularly between 1.5 and 2.5, it is desirable that:

by introducing $R_3Cl$ gradually into the liquid hydrocarbon medium containing $R_1MgR_2$, the agitation speed should be modified at a moment such that the quantity of $R_3Cl$ introduced into the reaction medium corresponds to a molar ratio of $R_3Cl:R_1MgR_2$ equal to or less than 0.25, or that the reaction should be performed by introducing, in a first stage, $R_3Cl$ and $R_1MgR_2$ gradually and simultaneously into the liquid hydrocarbon medium in quantities such that at most 50% of the quantities employed of these two reactants are introduced, then, in a second stage, by introducing the remaining quantity of $R_1MgR_2$ rapidly first, and then gradually the remaining quantity of $R_3Cl$ into the reaction medium, and that the speed of agitation should possibly be modified at any moment in the first stage referred to above of gradual and simultaneous addition of $R_3Cl$ and $R_1MgR_2$ into the liquid hydrocarbon medium.

When the process described above is implemented, a support is produced consisting of particles containing basically magnesium chloride and having the following properties:

the particles have a spheroidal shape defined by the fact that if D and d are the large and small axes of the particles, D:d is equal to or less than 1.3;

the particles have a mean diameter by mass which can be controlled at will and comprised between about 10 and 100 microns;

the particle size distribution of these particles is such that the ratio of the mean diameter by mass to the mean diameter by number, Dm:Dn, can be controlled at will and is less than or equal to 3.0, and in particular comprised between 1.1 and 2; it is also found that there is a practically total absence of large particles having a diameter greater than $2 \times Dm$ and of fine particles having a diameter less than $0.2 \times Dm$; the particle size distribution can in addition be such that more than 90% by weight of the particles of each batch fall within the range $Dm \pm 10\%$;

the surface of the particles may be slightly dented such as the surface of a raspberry, but is preferably very smooth;

the specific surface area of the particles is from about 20 to 60 sq.m/g (BET);

the density of the particles can be adjusted at will between 1.2 and 2.2, and depends on the proportion of the reactants employed;

the chemical composition of the support is such that:
  i. in order to prepare catalysts intended for the polymerisation and copolymerisation of ethylene, the atomic ratio Cl:Mg of the support is slightly less than 2; the support contains both low proportions of products with an Mg—C bond and of an electron donor compound;
  ii. in order to prepare catalysts intended for the polymerisation and copolymerisation of propylene, the atomic ratio Cl:Mg of the support is more or less equal to 2.

Magnesium chloride supports or based on magnesium chloride prepared according to the present invention are used for the preparation of catalysts for polymerising or copolymerising alphaolefins.

This preparation of catalysts may be carried out by all known means consisting in depositing on the surface of the support an active product which is a compound such as a chloride of a transition metal of groups IV, V and VI of the Periodic Table of Elements, preferably titanium. This metallic compound may be adapted in a known manner to the polymerisation of the alpha-olefin which it is desired to carry out.

It is important that the supports according to the invention should combine a set of physico-chemical and mechanical properties specially suited to the preparation of polymer powder and/or copolymers having a high apparent density, which proves to be of value on the industrial level, both for processes of polymerisation in suspension in a hydrocarbon and for polymerisation without solvent, as for example in a fluidised bed.

METHOD OF DETERMINING MEAN DIAMETERS BY MASS (Dm) AND BY NUMBER (Dn) OF SUPPORT PARTICLES OF MAGNESIUM CHLORIDE

The mean diameters by mass (Dm) and by number (Dn) of support particles of magnesium chloride are measured on the basis of microscope examinations with the OPTOMAX image analyser (Micro Measurements Ltd., Great Britain). The measuring principle consists in obtaining from the experimental study by optical microscopy of a population of magnesium chloride particles a table of absolute frequencies showing the number ($n_i$) of particles belonging to each class (i) of diameters, each class (i) being characterised by an intermediate diameter ($d_i$), comprised between the limits of the said class. According to the French Norm NF X 11-630 of June 1981, Dm and Dn are given by the following formula:

$$\text{mean diameter by mass: } Dm = \frac{\Sigma ni \, (di^3) \, di}{\Sigma ni \, (di^3)}$$

$$\text{mean diameter by number: } Dn = \frac{\Sigma ni \cdot di}{\Sigma ni}$$

The ratio Dm:Dn characterises the particle size distribution; it is sometimes called "width of particle size distribution".

Measurement of the OPTOMAX image analyser is performed by means of an inverted microscope which makes it possible to examine suspensions of magnesium chloride particles at an enlargement between $16 \times$ and $200 \times$. A television camera picks up the images given by the inverted microscope and transmits them to a computer, which analyses the images line by line and point by point on each line so as to determine the dimensions or diameters of the particles and then to classify them.

The following non-restrictive examples illustrate the invention.

EXAMPLE 1

Into a 1-liter glass reactor provided with a mechanical agitation system and a double jacket, previously filled with nitrogen, there are introduced successively 150 ml of n-heptane, 0.1 mole (13.85 g) of secondary butyl-n-butyl magnesium and various quantities of di-isoamyl ether specified in Table I.

After homogenising, the reaction medium is brought to a temperature of 50° C. in 15 minutes with an agitation of about 500 revolutions per minute.

By means of a dosing pump, 210 millimoles (19.44 g) of t-butyl chloride are introduced gradually into the reactor over 2 hours, and the reaction medium is maintained at 50° C. for a further 2 hours. The liquid is separated from the precipitate formed and the latter is washed in the reactor itself, several times in n-heptane at ambient temperature (20° C.).

Analysis of the precipitate formed shows that it is a solid consisting essentially of magnesium chloride, with spheroidal particles and a narrow particle size distribution, defined by the Dm:Dn ratio whose value is comprised between 1.1 and 2.0. In the total absence of electron donor compound (comparative test 1/1), the particles obtained have a very irregular shape and a very broad particle size distribution (Dm/Dn=4.5).

TABLE I

| Test | Di-isoamyl ether Milli-moles | molar ratio ether: organo-magnesium | MgCl₂ product Quantity (g) | yield (moles %) | Shape of particles | Dm (microns) | $\frac{Dm}{Dn}$ |
|---|---|---|---|---|---|---|---|
| 1/1* | 0 | 0 | 5.7 | 60 | Very small particles of irregular shape; widely spaced particle sizes. | 20 | 4.5 |
| 1/2 | 30 | 0.3 | 8.6 | 90 | Spherical particles | 30 | 1.3 |
| 1/3 | 60 | 0.6 | 8.9 | 93 | Spherical particles | 40 | 1.1 |

TABLE I-continued

| Test | Di-isoamyl ether Milli-moles | molar ratio ether: organo-magnesium | MgCl₂ product Quantity (g) | yield (moles %) | Shape of particles | Dm (microns) | $\frac{Dm}{Dn}$ |
| --- | --- | --- | --- | --- | --- | --- | --- |
| 1/4 | 100 | 1 | 8.9 | 93 | Spherical particles | 60 | 1.4 |
| 1/5 | 200 | 2 | 8.9 | 93 | Spherical particles | 65 | 2.0 |

EXAMPLE 2

Into a 5-liter stainless steel reactor, equipped with an agitation system rotating at 750 revolutions per minute and containing 800 ml of n-hexane, there are introduced at ambient temperature (20° C.) and under a blanket of nitrogen: 1725 ml of a solution of butyloctylmagnesium in n-hexane containing 1500 gramme milliatoms of magnesium and 153 ml (750 millimoles) of di-isoamyl ether. The reactor is then heated to 50° C. and 313 ml of t-butyl chloride (or 2,850 millimoles) are poured in drop by drop over 3 hours. At the end of this addition, the suspension is maintained at 50° C. for 3 hours, and then the precipitate obtained is washed five times with n-hexane. The washed solid product forms the support whose chemical composition per gramme atom of magnesium is as follows: 1.96 gramme atoms of chlorine; 0.04 gramme equivalent of Mg—C; and 0.02 mole of di-isoamyl ether. On examination under the microscope, it is seen to be a powder consisting of spheroidal particles (the mean ratio of the large and small axes, D:d, of the particles is equal to 1.2) with a particle size distribution such that $Dm:Dn=1.1$, where $Dm=52$ microns; in addition more than 90% by weight of the particles have a mean diameter between 47 and 57 microns; the density of the product is equal to 1.9 and its specific surface area 38 sq.m./g (BET).

EXAMPLE 3

The preparation is identical to that of Example 2, except for the fact that the quantity of di-isoamyl ether in admixture with butyloctylmagnesium is 6 ml (300 millimoles) instead of 153 ml (750 millimoles). Analysis of the product formed shows that it contains per gramme atom of magnesium: 1.96 gramme atoms of chlorine; 0.04 gramme equivalent of Mg—C; and 0.01 mole of di-isoamyl ether. On examination under the microscope, the powder obtained is seen to be in the form of spheroidal particles with a particle distribution size such that $Dm:Dn-1.3$, where $Dm=32$ microns; less than 0.1% by weight of particles with a diameter of less than 5 microns are measured; the spheroidal particles of magnesium chloride obtained in this example show a slightly dented surface of the "raspberry" type; the density of the product is equal to 1.8 and its specific surface area to 41 sq.m./g (BET).

EXAMPLE 4

The preparation is identical to that of Example 2, except for the fact that the di-isoamyl ether, instead of being mixed exclusively with the butyloctylmagnesium, is divided between the latter and t-butyl chloride: 9.1 ml (or 44.7 millimoles) in admixture with the solution of butyloctylmagnesium in hexane and 91 ml (or 447 millimoles) in admixture with t-butyl chloride. Analysis of the solid product obtained gives the following composition per gramme-atom of magnesium: 1.95 gramme-atoms of chlorine; 0.05 gramme-equivalent of Mg—C and 0.02 mole of di-isoamyl ether. On examination under the microscope, the powder is seen to be in the form of spheroidal particles with a particle size distribution such that $Dm:Dn=1.2$ where $Dm=23$ microns; less than 0.05% by weight of particles of a diameter less than 4.6 microns are found; the small size of the spheroidal particles obtained in this example is due to the low quantity of electron donor compound used with the butyloctylmagnesium; the spheroidal particles show an extremely smooth surface without any denting; this is due to the electron donor compound added in admixture with the t-butyl chloride; the density of the product is particularly high and equal to 2.1 and its specific surface area is equal to 46 sq.m./g (BET).

EXAMPLE 5 AND 6

The preparation is identical to that of the preceding example (Example 4) except for the fact that the speed of agitation is fixed at 600 revolutions per minute for Example 5 and at 500 revolutions per minute for Example 6; the effect of this is to increase the mean diameter by mass of the spheroidal particles which changes from 23 microns (Example 4) to 38 microns for Example 5 and 47 microns for Example 6.

The particle size distribution is such that in all cases Dm:Dn is comprised between 1.1 and 1.5.

EXAMPLE 7

The preparation is identical to that of Example 2, except for the fact that diethyl ether is employed instead of di-isoamyl ether and in a much smaller quantity, viz. 4.7 ml (45 millimoles) of diethyl ether in the solution containing butyloctylmagnesium. On examination under the microscope, the powder is seen to be in the form of spheroidal particles with a particle size distribution such that $Dm:Dn=1.3$ with $Dm=11$ microns; the spheroidal particles have a slightly dented surface, of the "raspberry" type.

EXAMPLE 8

Into a 5-liter stainless steel reactor equipped with an agitator system rotating at 650 revolutions per minute and containing 1 liter of n-hexane there are introduced at ambient temperature (20° C.) and under a blanket of nitrogen: 1725 ml of a solution of butyloctylmagnesium in hexane containing 1500 gramme-milliatoms of magnesium. The reactor is heated to 55° C. and a mixture prepared beforehand containing 313 ml of t-butyl chloride (or 2850 millimoles) and 7.9 ml of hexamethylphosphorotriamide (HMPA) (or 45 millimoles) is poured in gradually over 6 hours. At the end of this addition, the suspension is kept at 55° C. for 3 hours and the precipitate obtained is then washed five times with n-hexane. The solid product constitutes the support whose chemical composition per gramme-atom or magnesium is as follows: 1.99 gramme-atoms of chlorine, 0.01 gramme-equivalent of Mg—C and 0.03 mole of HMPA. On examination under the microscope, the powder is seen to be in the form of spheroidal particles with a particle size distribution such that $Dm:Dn=1.5$ where $Dm=23$ microns; less than 0.1% by weight of particles with a diameter of less than 5 microns is found; the spheroidal particles have a slightly dented surface, of the "raspberry" type.

EXAMPLE 9

The preparation is identical to Example 3, except for the fact that the butyloctylmagnesium is replaced by secondary butyl-n-butyl magnesium. The powder obtained gives an analysis the following results per gramme-atom of magnesium: 1.95 gramme-atoms of chlorine; 0.05 gramme-equivalent of Mg—C; and 0.03 mole of di-isoamyl ether; the powder is seen to be in the form of spheroidal particles with a particle size distribution such that $Dm:Dn=1.5$ where $Dm=30$ microns; unlike Example 3, the surface of the spheroidal particles is very smooth and not dented.

EXAMPLE 10

The preparation is identical to that of Example 3 except for the fact that the butyloctylmagnesium is replaced by butylethyl-magnesium. The solid product obtained contains per gramme atom of magnesium: 1.98 gramme-atoms of chlorine, 0.02 gramme-equivalent of Mg—C and 0.01 mole of di-isoamyl ether; the powder is seen to be in the form of spheroidal particles with a particle size distribution such that $Dm:Dn=1.4$ where $Dm=34$ microns; in addition, as in Example 9, the surface of the spheroidal particles is very smooth and not dented.

EXAMPLE 11

The preparation is identical to that of Example 4, except for the fact that the butyloctylmagnesium is replaced by secondary butyl-n-butyl magnesium. The solid support obtained is seen to be in the form of spheroidal particles with a particle size distribution such that $Dm:Dn=1.1$ were $Dm=20$ microns; the density of the product is equal to 1.85; more than 90% by weight of the particles have a mean diameter between 18 and 22 microns.

EXAMPLE 12

Into a 5-liter stainless steel reactor equipped with an agitator system rotating at 500 revolutions per minute and containing 1 liter of n-hexane there are introduced at ambient temperature (20° C.) and under a blanket of nitrogen: 9.5 ml (47 millimoles) of di-isoamyl ether. The reactor is heated to 55° C. and there are introduced gradually over 1 hour and at the same time, on the one hand 667 ml of a 0.81 molar solution of butyloctylmagnesium in n-hexane and on the other hand 148 ml of a previously prepared mixture of 348 ml of t-butyl chloride and 95 ml of di-isoamyl ether. At the end of this period there are introduced into the reaction medium all at once and rapidly 1334 ml of the 0.81 molar solution of butyloctylmagnesium in n-hexane and gradually over 2 hours the remaining 295 ml of the previously prepared mixture of t-butyl chloride and di-isoamyl ether. The mixture is then maintained for 3 hours with agitation at 55° C. The product obtained is washed several times with n-hexane. The magnesium chloride support consists of spheroidal particles with a particle size distribution such that $Dm:Dn=1.6$ where $Dm=15$ microns.

EXAMPLE 13

The preparation of identical to that of Example 12, except for the fact that the speed of agitation, instead of being constantly equal to 500 revolutions per minute, is equal to 400 revolutions per minute for the first half-hour of the reaction when the butyloctylmagnesium and the mixture of t-butyl chloride and di-isoamyl ether are introduced gradually and simultaneously, then to 800 revolutions per minute for the following two-and-a-half hours. At the end of the introduction of all the reactants into the reaction medium, the agitation speed is reduced to 400 revolutions per minute. The magnesium chloride support obtained consists of spheroidal particles with a particle size distribtuion such that $Dm:Dn=2.5$ where $Dm=18$ microns.

EXAMPLE 14

Into a 5-liter stainless steel reactor equipped with an agitator system rotating at 400 revolutions per minute and containing 1 liter of n-hexane there are introduced at ambient temperature (20° C.) and under a blanket of nitrogen: 9.5 ml (47 millimoles) of di-isoamyl ether. The reactor is heated to 55° C. and gradually over 1 hour and simultaneously there are introduced on the one hand 667 ml of a 0.81 molar solution of butyloctylmagnesium in n-hexane and on the other hand 116 ml of t-butyl chloride. After half an hour of this gradual and simultaneous introduction of the reactants, the speed of agitation is increased to 800 revolutions per minute. At the end of this gradual and simultaneous introduction of the reactants, the agitation speed is maintained at 800 revolutions per minute, and there are introduced into the reaction medium all at once and rapidly 1334 ml of the 0.81 molar solution of butyloctylmagnesium in n-hexane then gradually, over 2 hours, 232 ml of t-butyl chloride. At the end of this period, the speed of agitation is reduced to 400 revolutions per minute, and the mixture is maintained for 3 hours at 55° C. The solid product obtained is washed several times with n-hexane. The magnesium chloride support is composed of spheroidal particles of a particle size distribution such that $Dm:Dn=2.4$ where $Dm=15$ microns.

We claim:

1. Catalyst supports for the polymerization and co-polymerization of alpha-olefins, especially ethylene and propylene, consisting essentially of magnesium chloride, characterized in that they occur in the form of spheroidal particles having a mean diameter by mass comprised between 10 and 100 microns and a narrow and controllable particle size distribution, such that the ratio of the mean diameter by mass, Dm, to the mean diameter by number, Dn, is equal to or less than 3.

2. Supports in accordance with claim 1, characterised in that the spheroidal particles of magnesium chloride have a particle size distribution such that the ratio, Dm:Dn, of the mean diameter by mass to the mean diameter by number of the particles is comprised between 1.1 and 2.

3. Supports in accordance with claim 1 characterised in that the spheroidal particles of magnesium chloride have a particle size distribution such that the ratio Dm:Dn of the particles is comprised between 1.1 and 1.5.

4. Supports in accordance with claim 1 characterised in that the spheroidal particles of magnesium chloride have a particle size distribution such that the ratio $Dm:Dn$ of the particles is comprised between 1.5 and 2.5.

5. Supports in accordance with claim 1 characterised in that the spheroidal particles of magnesium chloride has a particle size distribution such that more than 90% by weight of the particles of each batch are comprised in the range $Dm \pm 10\%$.

6. Supports in accordance with claim 1, characterised in that the spheroidal particles of magnesium chloride have a specific surface area of approximately 20 to 60 sq..m./g (BET) and have a smooth surface.

7. Supports in accordance with claim 1, characterized in that in addition to magnesium chloride they comprise products having at least one Mg—C bond and an electron donor compound, and in that their density is comprised between 1.6 and 2.2.

8. Supports in accordance with claim 1, characterized in that they do not comprise any products having at least one Mg—C bond, but contain an electron donor compound and in that their density is comprised between 1.2 and 2.1.

9. Process for the preparation of catalyst supports in accordance with claim 1 by reaction in a liquid hydrocarbon medium of an organomagnesium compound and a chlorinated organic compound, characterised in that the said reaction is performed under the following conditions:

the organomagnesium compound used is a dialkyl-magnesium of the formula $R_1MgR_2$, in which $R_1$ and $R_2$ are alkyl radicals which are identical or different and having 2 to 12 carbon atoms, soluble in the liquid hydrocarbon in which the reaction is carried out, the chlorinated organic compound is an alkyl chloride of the formula $R_3Cl$, in which $R_3$ is a secondary or a tertiary alkyl radical, having 3 to 12 carbon atoms, the molar ratio between this chlorinated organic compound and the organomagnesium compound being comprised between 1.5 and 2.5, the reaction is performed in the presence of an electron donor compound comprising at least one atom of oxygen, sulphur, nitrogen and/or phosphorus, in a quantity such that the molar ratio between this electron donor compound and the organomagnesium compound is comprised between 0.01 and 2, the reaction takes place under agitation in a liquid hydrocarbon at a temperature comprised between 5° and 80° C.

10. Process in accordance with claim 9, characterised in that the electron donor compound is an aliphatic ether oxide of the formula $R_4OR_5$, in which $R_4$ and $R_5$ are identical or different alkyl radicals having 1 to 12 carbon atoms.

11. Process according to claim 10, characterised in that the reaction is carried out under the following conditions:

the organomagnesium compound used is a dialkyl-magnesium of the formula $R_1MgR_2$, in which $R_1$ and $R_2$ are alkyl radicals having 2 to 12 carbon atoms, soluble in the liquid hydrocarbon in which the reaction is carried out, the chlorinated organic compound is an alkyl chloride of the formula $R_3Cl$, in which $R_3$ is a secondary or a tertiary alkyl radical, having 3 to 12 carbon atoms, the molar ratio between this chlorinated organic compound and the organomagnesium compound being comprised between 1.5 and 2.5, the reaction is performed in the presence of an aliphatic ether-oxide of formula $R_4OR_5$, in which $R_4$ and $R_5$ are alkyl radicals having 1 to 12 carbon atoms, in a quantity such that the molar ratio between this ether and the organomagnesium compound is comprised between 0.03 and 1, all of the ether being introduced together with the organomagnesium compound, or divided between the latter and the alkyl chloride, the reaction takes place in a liquid hydrocarbon at a constant temperature comprised between 35° and 80° C.

12. Process in accordance with claim 9, characterised in that the reaction is performed by introducing the chlorinated organic compound gradually into the liquid hydrocarbon medium containing the organomagnesium compound.

13. Process in accordance with claim 9, characterised in that the reaction is performed under constant agitation throughout the duration of the reaction.

14. Process in accordance with claim 12, characterised in that the speed of agitation is modified at a moment when the quantity of chlorinated organic compound introduced gradually into the liquid hydrocarbon medium containing the organo-magnesium compound corresponds to a molar ratio of $R_3Cl:R_1MgR_2$ of less than or equal to 0.25.

15. Process in accordance with claim 9, characterised in that the reaction is performed by introducing, in a first stage, in a gradual manner and simultaneously the organomagnesium compound and the chlorinated organic compound into the liquid hydrocarbon medium in quantities such that at most 50% of the quantities of each of the reactants employed is introduced, then in a second stage, by introducing first the remaining quantity of the organomagnesium compound rapidly, and then the remaining quantity of the chlorinated organic compound gradually, into the reaction medium.

16. Process in accordance with claim 15, characterised in that the reaction is performed by modifying the speed of agitation at any moment of the stage of gradual and simultaneous introduction of the organomagnesium compound and of the chlorinated organic compound into the liquid hydrocarbon medium.

17. Process in accordance with claim 9, characterised in that the molar ratio between the chlorinated organic compound and the organomagnesium compound is comprised between 1.85 and 1.95, and in that the product obtained is utilised for the preparation of catalysts for polymerising or copolymerising ethylene or propylene.

18. Process in accordance with claim 9, characterised in that the molar ratio between the chlorinated organic compound and the organo-magnesium compound is comprised between 1.95 and 2.2, and in that the product obtained is used for the preparation of catalysts for polymerising or copolymerising propylene.

19. Process in accordance with claim 9, characterised in that the molar ratio between this electron donor compound and the organomagnesium compound is comprised between 0.01 and 1.

20. Process in accordance with claim 11, characterised in that the molar ratio between this ether and the organomagnesium compund is comprised between 0.2 and 0.5.

21. Catalyst supports for the polymerisation and copolymerisation of alpha-olefins, especially ethylene and propylene, consisting essentially of magnesium chloride, characterised in that they occur in the form of spheroidal particles having a mean diameter by mass, Dm, comprised between 10 and 100 microns and a narrow and controllable particle size distribution, such that more than 90% by weight of the particles of each batch are comprised in the range $Dm \pm 10\%$.

* * * * *

UNITED STATES PATENT AND TRADEMARK OFFICE
CERTIFICATE OF CORRECTION

PATENT NO. : 4,490,475
DATED : December 25, 1984
INVENTOR(S) : Jean C. Bailly and Stylianos Sandis It is certified that error appears in the above-identified patent and that said Letters Patent is hereby corrected as shown below:

Col. 2, line 29, "the content of weight" should read --the content by weight--

Col. 6, line 18, "Measurement of" should read --Measurement by--

Col. 7, Following Table I, --* Comparative Test-- has been omitted

Col. 7, line 42, "is 6 ml" should read "is 61 ml--

Col. 7, line 50, "Dm:Dn - 1.3," should read "Dm:Dn = 1.3,--

Col. 8, line 66, "gramme-atom or magnesium" should read --gramme-atom of magnesium--

Col. 9, line 13, "gives an analysis" should read --gives on analysis--

Col. 10, line 3, "preparation of identical" should read --preparation is identical--

Col. 12, line 57, claim 20, "organomagnesium compund is" should read --organomagnesium compound is--

Signed and Sealed this

Twenty-first Day of May 1985

[SEAL]

Attest:

DONALD J. QUIGG

Attesting Officer    Acting Commissioner of Patents and Trademarks